US006347306B1

(12) United States Patent  
Swart

(10) Patent No.: US 6,347,306 B1
(45) Date of Patent: Feb. 12, 2002

(54) METHOD AND SYSTEM FOR DIRECT PAYROLL PROCESSING

(75) Inventor: Marius Swart, Basking Ridge, NJ (US)

(73) Assignee: CyberShift.com, Inc., Parsippany, NJ (US)

( * ) Notice: Subject to any disclaimer, the term of this patent is extended or adjusted under 35 U.S.C. 154(b) by 0 days.

(21) Appl. No.: 09/354,469

(22) Filed: Jul. 15, 1999

Related U.S. Application Data

(60) Provisional application No. 60/093,595, filed on Jul. 21, 1998.

(51) Int. Cl.[7] .............................................. G06F 17/60
(52) U.S. Cl. ............................................. 705/32; 705/1
(58) Field of Search ............................. 705/30, 32, 40, 705/39, 1; 235/375–377

(56) References Cited

U.S. PATENT DOCUMENTS

| | | | | |
|---|---|---|---|---|
| 4,323,771 A | * | 4/1982 | Chalker, Jr. et al. | 235/377 |
| 4,819,162 A | * | 4/1989 | Webb, Jr. et al. | 705/32 |
| 5,600,554 A | * | 2/1997 | Williams | 705/1 |
| 5,717,867 A | * | 2/1998 | Wynn et al. | 705/32 |
| 5,842,182 A | * | 11/1998 | Bonner et al. | 705/32 |

FOREIGN PATENT DOCUMENTS

| | | | | |
|---|---|---|---|---|
| CH | 558574 | * | 1/1975 | 705/32 |
| JP | 05-028337 | * | 2/1993 | |

OTHER PUBLICATIONS

*Industrial Engineering* article "CIMPath helps sharpen company's competitive edge" (vol. 25, Issue 10), dated Oct. 1993.*

*Automatic I.D. News* article "Jensen Farms makes piece with payroll" (ISSN: 0890–9768), dated Sep. 1997.*

*Accounting Technology* article "Web–based payroll: Always open" (vol. 15, Issue 3), dated Apr. 1999.*

"CyberPay", website pages from www.adaptasoft.com, No Date.

"Virtual Payroll", website pages from www.virtualpayroll.com, No Date.

"ADP PC/Payroll For Windows", website pages from www.adp.com, No Date.

* cited by examiner

Primary Examiner—Dean J. Kramer
(74) Attorney, Agent, or Firm—Lerner, David, Littenberg, Krumholz & Mentlik, LLP

(57) ABSTRACT

A computer-implemented method and system for automatically paying employees net pay immediately upon completion of a work segment provides time and attendance, human resource, payroll processing and banking computer systems interconnected via an on-line computer network to calculate net pay for each work segment completed the employee, in real-time and immediately upon entry of shift completion information. The system determines gross work segment pay based on the shift completion information and the employee's payment rate for the shift and then computes net work segment pay by applying deduction information to the gross work segment pay. The net work segment pay information is then sent to the banking computer system to allow the bank to provide the employee with immediate access to the net work segment pay; preferably via direct deposit banking.

21 Claims, 3 Drawing Sheets

METHOD AND SYSTEM FOR DIRECT PAYROLL PROCESSING

CROSS-REFERENCE TO RELATED APPLICATIONS

This application claims the benefit of U.S. Provisional Application No. 60/093,595 filed on Jul. 21, 1998, the disclosure of which is hereby incorporated by reference herein.

FIELD OF THE INVENTION

The present invention relates to the field of payroll processing and, more particularly, to a computerized direct payroll processing system that acquires input data from time and attendance and human resource systems to implement immediate, real-time payroll distribution and processing to employees.

BACKGROUND OF THE INVENTION

Today, most companies with more than a handful of employees use an outside payroll service to assist with payroll processing for their employees. As shown in FIG. 1 (prior art), a company typically employs off-the-shelf human resource ("HR") software packages such as an ERP (Enterprise Resource Planning) system which is customizable for the particular industry and business. The ERP system provides employee information such as employee number, department, pay schedule, pay scale, benefits, etc., which are used in determining the pay for the employee.

The information from the ERP system is typically used in the setup of internal payroll software and in the setup of time and attendance ("T&A") software, such as Master Data or Demographic Data, including addresses, departmental information and rates etc. The payroll software is ultimately used in the transfer of payroll information to the outside payroll service by inputting formatted data from a T&A system.

The T&A software is used for tracking (manually and/or automatically) the time and attendance data of employees to provide a record of when the employee has worked (days and hours), the particular shifts worked, days off, sick days, etc. This information is used for determining employee pay as well.

T&A systems are used to acquire T&A data, typically on a daily basis. The data can be acquired in many different ways such as through punch clocks, computer log-ins and log-outs, badge readers, turnstiles, card swipes, etc. Authorization can be provided to determine whether an employee who has worked certain hours during a certain shift was authorized to do so or may need a superior to authorize deviations from normal working hours or shifts.

Once the T&A information has been gathered and authorized, the T&A software package can be used to calculate gross hours and dollars for each employee. This is typically done for a one-week or two-week period.

The next step is that the gross hours and dollars information is sent through an interface program to the payroll system. The payroll system uses its own proprietary software to calculate net pay for each employee by taking gross pay and subtracting deductions such as taxes (federal, social security, Medicare, state) and any other needed adjustments (401K contributions, pension plan, etc.). The payroll system can be provided in-house or by an outside payroll service, such as ADP. If the system is internal, however, the net pay information must in any event be sent to an outside payroll service. The final net pay information is sent by submitting electronic data to the bank which either provides a check to the employee or directly deposits the payment amount into the employee's account through direct deposit banking. The payroll service also usually provides the employee with limited payroll information printed on a stub attached to the check or on a separate report.

The above payroll systems are cumbersome and problematic. They require the use of a "middleman" payroll service to either send or calculate and send the employee's net pay data to the bank, which increases costs to the employer. These costs are ultimately passed on to the employees and public. Such systems also take significant amounts of time to acquire, transfer, translate and process all of the data required to determine and distribute net pay to the employee; and employees are therefore forced to wait one or two weeks before even receiving their paychecks.

Another disadvantage of the prior art payroll systems is the use of centralized data processing for calculation of net pay, such as used by ADP. While centralized processing can be beneficial for security reasons in that data is contained within one application, which is typically not the user's location, it is inflexible and time-consuming. A further disadvantage with centralized processing is that the system cannot add components to the process to co-exist with current business tasks. That is, no new business logic can be added to the system. Finally, the user cannot change the frequency of processing, since this is controlled by ADP.

Accordingly, the present invention overcomes the above disadvantages and problems of prior art payroll systems and provides new advantages to the employer and employees by addressing the aforementioned problems and providing payroll processing which occurs in real-time, immediately upon completion of the employee's shift or work segment. With the present invention, the third party outside payroll service model is eliminated which provides numerous benefits to the company, employees and to the bank.

SUMMARY OF THE INVENTION

One aspect of the present invention provides a computer-implemented method for automatically paying employees net pay immediately upon completion of a work segment. The method includes providing an employee data computer system, a banking computer system and a payroll processing computer system, each interconnected via a computer network. According to this method, time and attendance information is acquired in real-time by the employee data computer system from each employee, including shift completion information indicative of the completion of at least one work segment. Human resource information about each employee is inputted into the employee data computer including pay amount information and pay deduction information for each employee.

Shift completion information, pay amount information and pay deduction information is provided to the payroll processing computer system via the computer network. The method then calculates, by the payroll processing computer system, net work segment pay for each work segment completed by the employee, in real-time and immediately upon entry of the shift completion information, by determining (i) gross work segment pay based on the shift completion information and pay amount information and (ii) the net work segment pay by applying the pay deduction information to the gross work segment pay. Finally, data indicative of the net work segment pay is provided to the banking computer system via the computer network upon the completion net work segment pay calculation step to provide the employee with immediate access to the calculated net work segment pay, preferably via direct deposit to the employee's bank account.

Another aspect of the present invention provides a computer-implemented system for automatically paying employees net pay immediately upon completion of a work segment. The system includes an employee data client computer system including at least one time and attendance software object and at least one human resource software object, at least one input terminal connected to the employee data client computer system for acquiring in real-time time and attendance information from each employee including shift completion information indicative of the completion of at least one work segment, and at least one input terminal connected to the employee data client computer system for inputting human resource information about each employee including pay amount information and pay deduction information for each employee. The time and attendance software object comprises time and attendance logic operative to automatically modify the shift completion information under predetermined conditions, and the human resource software object comprises human resource logic operative to automatically modify the pay amount information under predetermined conditions.

The system further includes a payroll client computer with at least one payroll software object comprising net pay calculation logic for computing net work segment pay and a payroll application server computer connected to the employee data client computer system and the payroll client computer via the Internet using a programming language-neutral communications protocol. A computer storage device is also provided in communication with the payroll application server computer for storing the shift completion information, pay amount information, pay deduction information and net work segment pay. The system further includes a banking client computer in communication with the computer storage device.

The payroll software object is operative to calculate, using the net pay calculation logic, net work segment pay for each work segment completed by the employee, in real-time and immediately upon entry of the shift completion information, by determining (i) gross work segment pay based on the shift completion information and the pay amount information and (ii) the net work segment pay by applying the pay deduction information to the gross work segment pay. Additionally, the banking client computer is operative to automatically receive data indicative of the net work segment pay upon completion of the net work segment pay calculation to provide the employee with immediate access to the calculated net work segment pay, preferably via directly depositing the net work segment pay to the employee's bank account.

In a particularly preferred embodiment, the system includes a third party client computer connected to the payroll application server via the Internet using a programming language-neutral communications protocol, and includes a third party deduction calculation software object comprising deduction logic operative to calculate additional deductions, to be included with the pay deduction information, in proportion to the gross work segment pay. Preferably, the deduction logic is operative to calculate tax deductions from the gross work segment pay in amounts corresponding to the duration of the completed work segment.

The software objects desirably comprise JavaBeans and the programming language-neutral communications protocol comprises CORBA. Further, each employee is preferably provided with on-line access to securely log onto a website associated with the banking computer system to check on and verify the provision of the net work segment pay to the employee's bank account.

Another preferred aspect of the present invention provides a computer-implemented system for automatically paying employees net pay immediately upon completion of a work segment. The system comprises an employee data computer system, a banking computer system and a payroll processing computer system, and each of the computer systems are interconnected via a computer network. Also provided is at least one input terminal connected to the employee data computer system for acquiring in real-time time and attendance information from each employee including shift completion information indicative of the completion of at least one work segment, and at least one data terminal connected to the human resource computer system for inputting human resource information about each employee including pay amount information and pay deduction information for each employee. The payroll processing computer system includes calculation logic for calculating net work segment pay for each work segment completed by the employee, in real-time and immediately upon entry of the shift completion information, by determining (i) gross work segment pay based on the shift completion information and the pay amount information and (ii) the net work segment pay by applying the pay deduction information to the gross work segment pay. Finally, the banking computer system is operative to receive data indicative of the net work segment pay upon the net work segment pay calculation to provide the employee with immediate access to the calculated net work segment pay, preferably via direct deposit to the employee's bank account.

In a preferred arrangement, the shift completion information includes information approving the completion of the work segment. Further, the employee data computer system can comprise both a time and attendance computer system and a human resources computer system. The payroll processing computer system can also comprise two or more payroll computers and the net work segment pay calculation can be performed in part on each of the payroll computers.

In another preferred aspect, a computer-implemented system for automatically paying employees net pay upon completion of a work segment is provided, and includes: a multi-tiered computer network comprising at least a client and application tier interfacing with one or more client and application cartridges to permit communications among the cartridges over a common communications bus; a human resource computer system including an ERP program operative to store and manage employee payroll characteristics including pay amount information and pay deduction information, the ERP program including at least one ERP application cartridge interfacing with the application tier; a time and attendance computer system connected to the computer network for acquiring in real-time time and attendance information from each employee, including shift completion information indicative of the completion of at least one work segment, the T&A computer system including at least one time and attendance application cartridge interfacing with the application tier; and a banking computer system connected to the computer network including at least one payment application cartridge operative to calculate network segment pay for each work segment completed by the employee, in real-time and immediately upon entry of the shift completion information by the employee, by determining (i) gross work segment pay based on the shift completion information and (ii) the network segment pay by applying the pay deduction information to the gross work segment pay.

These aspects and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

The present invention provides an automated, computerized method and system for direct payroll processing, without the use of a third-party payroll service, that dramatically changes the way employees are paid. A flow diagram of a preferred embodiment of the invention is illustrated in FIG. 2.

Figure 2:
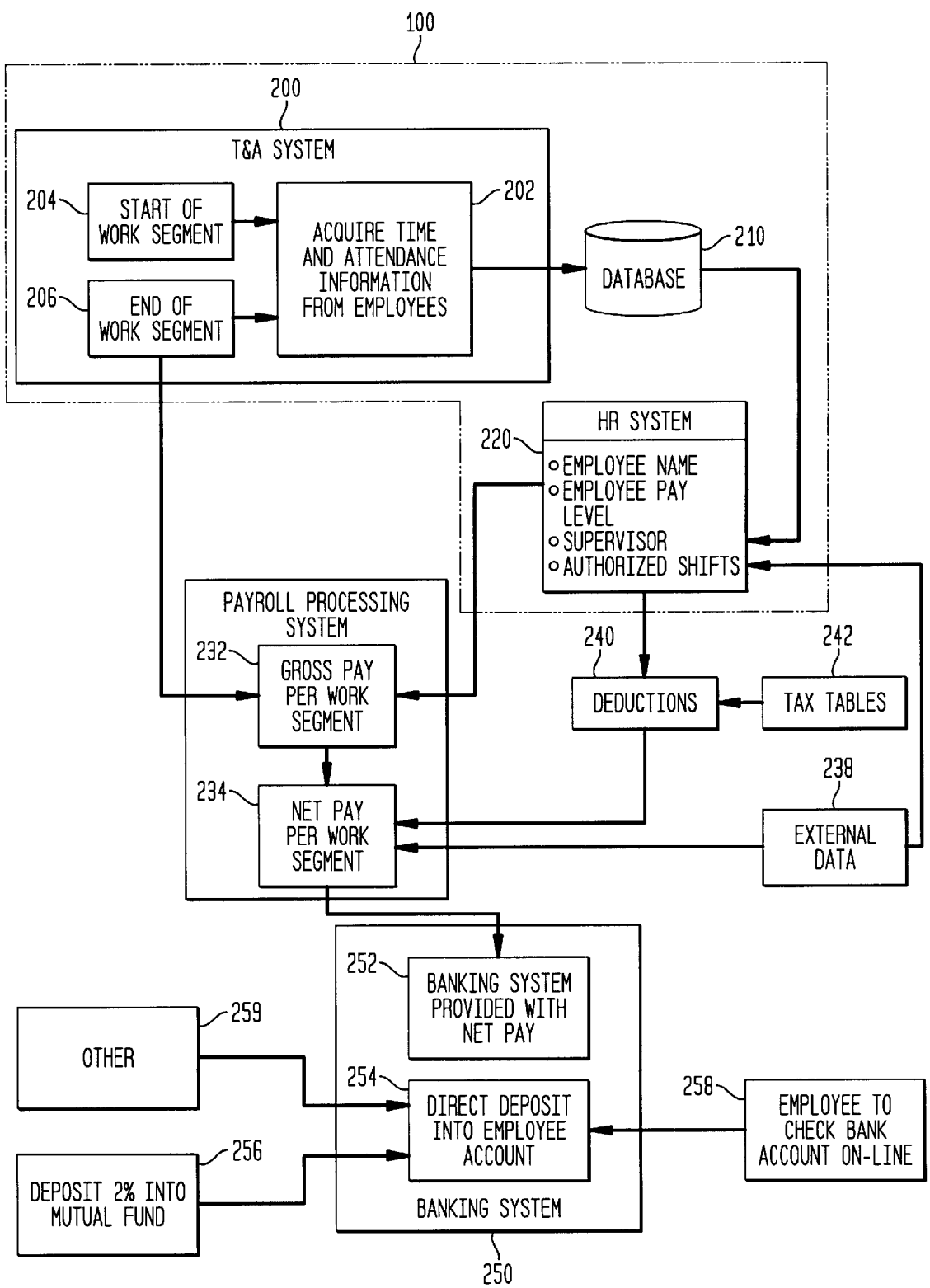
FIG. 2 is a flow diagram of the steps for calculating and distributing employee payroll in accordance with the present invention.

As shown in FIG. 2, the computer-implemented payroll processing system includes an employee data computer system 100 including a time and attendance ("T&A") computer system 200 and a human resources ("HR") computer system 220. The above computer systems can comprise one or more computers, such as PC's, workstations, mainframes, networked systems such as LANs and Intranets, etc. The system also includes payroll processing computer system 230 and banking computer system 250. These systems can be combined in one system or comprise separate stand-alone systems.

The T&A system 200 collects and stores employee time and attendance information in database 210, in real-time. T&A computer systems are offered by many companies such as Amano Corporation of Yokohama, Japan and ABI-TruTrac, Inc. of Parsippany, N.J. The T&A computer system tracks employee time and attendance information through input devices such as swipe cards, key strokes indicating when employees log into and out of their computers, punch cards terminals, etc. T&A systems used with the present invention can include Amano's CS500 thin client computer system, TruTrac's CyberShift system and TruTrack's customized client/server system. Other vendors' T&A systems can be used instead of, or in addition to, the above-mentioned T&A systems.

The T&A computer system 200 provides indication that a shift has been completed by an employee in the form of shift completion information. Shift completion information includes the event by which the employee informs the T&A system that he has completed a shift or work segment (e.g., upon log-out of a computer). Thus, the employee indicates to the T&A system the start of the work segment, represented by block 204, and then the completion of the work segment, represented by block 206. In addition, shift completion information can also include the event of authorization by which a supervisor or the like must authorize the shift. This can be done, for example, by computer key strokes in which the supervisor receives a message on his computer that the employee has just completed an overtime shift and approval is needed. Preferably, in one arrangement, the supervisor's computer instantly receives a message that authorization is needed to enable approval of the shift as near as possible to the shift's completion. In the instance where authorization is needed, while the employee may not get paid his net pay immediately upon completion of the shift, the net pay will be dispensed to the employee immediately upon the event of the supervisor or other personnel authorizing the shift. In either case, the present invention advantageously puts the net pay into the employee's hands immediately when the shift is completed or completed and authorized.

Human resources (HR) computer system 220 contains employee information needed for the net pay calculation. Typically, once an employee starts a new job or project, the human resources department creates an employee profile, which comprises information about the employee such as where the employee works, how the employee is to be paid, vacation days allotted to the employee, the department the employee is located in, the employee's supervisor, the benefits the employee receives, etc. This information is collected and stored by the HR computer system such as in database 210.

Deduction information 240 is also stored by the HR computer system including, for example, pension contributions, 401k deductions, health insurance deductions, etc. Tax tables 242 for per work segment calculations of withholdings of federal and state taxes, social security, workers compensation contributions, etc. can also be provided by the HR computer system or can be obtained dynamically over the Internet or other network from outside sources.

Human resource systems that can be used with the present invention include ERP Systems (such as SAP or Oracle), legacy or stand-alone systems (such as Ceridian or ADP) or external systems such as a Microsoft Excel spreadsheet, which may or may not reside with the employer. In the event that disparate or different companies' T&A and HR systems are used, translation and coding of the time and attendance data and human resources data is preferably provided by payroll processing system 230 into a normalized format. For instance, code translator logic can be provided to take earning codes and absence codes from different software packages and put them into a universal format understandable by payroll processing system 230. Typically, earnings codes are used for matters such as different work segments, jury duty, overtime, etc. and absence codes provide accounting codes for different types of employee leave such as annual leave, sick leave and maternity leave.

In a preferred embodiment, data external to the T&A and HR systems, represented by External Data block 238, can be provided to payroll processing system 230. Such data may be necessary for calculation of employee net pay. External Data 238 can include, for example, bonus data for employee bonuses awarded based upon commissions, wages garnish data, reimbursement of expenses, and charges to the employee such as from cafeteria debits. Again, this external data is preferably formatted to be usable by the payroll processing system. Preferably, the External Data 238 can also be sent to payroll processing system (or even the HR system) via the computer network (such as via the Internet) as soon as it is accumulated, in real time, rather than being provided at the end of the month or year from third parties.

Payroll processing computer system 230 is operative to calculate each employee's net "work segment" pay based on information from the T&A and HR systems, along with External Data if used. The payroll processing computer system can also, in a preferred embodiment, rely upon the processing ability of additional computers such as calculation from a third-party computer containing logic for the tax deductions occurring at tax table block 242. A work segment as used herein comprises a fixed amount of time worked by the employee which can include a shift (e.g., a two-hour shift), a full work day, or other accumulated hours worked. Gross work segment pay is first calculated at operation 232. For instance, based upon the information from the T&A and HR systems, if employee John Smith has completed a shift of 4 hours (tracked by the T&A system) and gets $50 per hour for that shift (the payment rate set in the HR system), gross pay will be calculated as $50 times 4, or $200 gross pay for completion of that shift. Next, net work segment pay is calculated at operation 234 by applying pay deduction information, and External Data if provided, to the gross work segment pay.

The net work segment pay calculation preferably is triggered upon the event of the employees entering his shift completion information. For example, such information could be entered when the employee punches out at the end of the shift such that the work segment comprises the time worked from punch-in to punch-out. Thus, upon punching-out, the payroll processing system will begin its net pay calculations. Alternatively, the triggering of the net pay calculation could occur upon supervisor approval of the shift.

Once the payroll processing system calculates net work segment pay, it is immediately transmitted to banking system 250. Banking system 250 retrieves net work segment pay 252 from the payroll processing system 230 through the network once the net work segment pay has been calculated. Once the banking system 250 retrieves an employee's net work segment pay, the bank can then issue a check or, preferably, deposits the net pay directly into the employee's bank account 254. Preferably, the banking system can also allow the employee to make changes to the deposit 256. For example, an employee can specify to withdraw 2% of the employee's pay and automatically deposit the money into a mutual fund. The banking system further provides the employee with the ability to check the bank account on-line, such as via a web browser or other communication portal 258.

Figure 3:
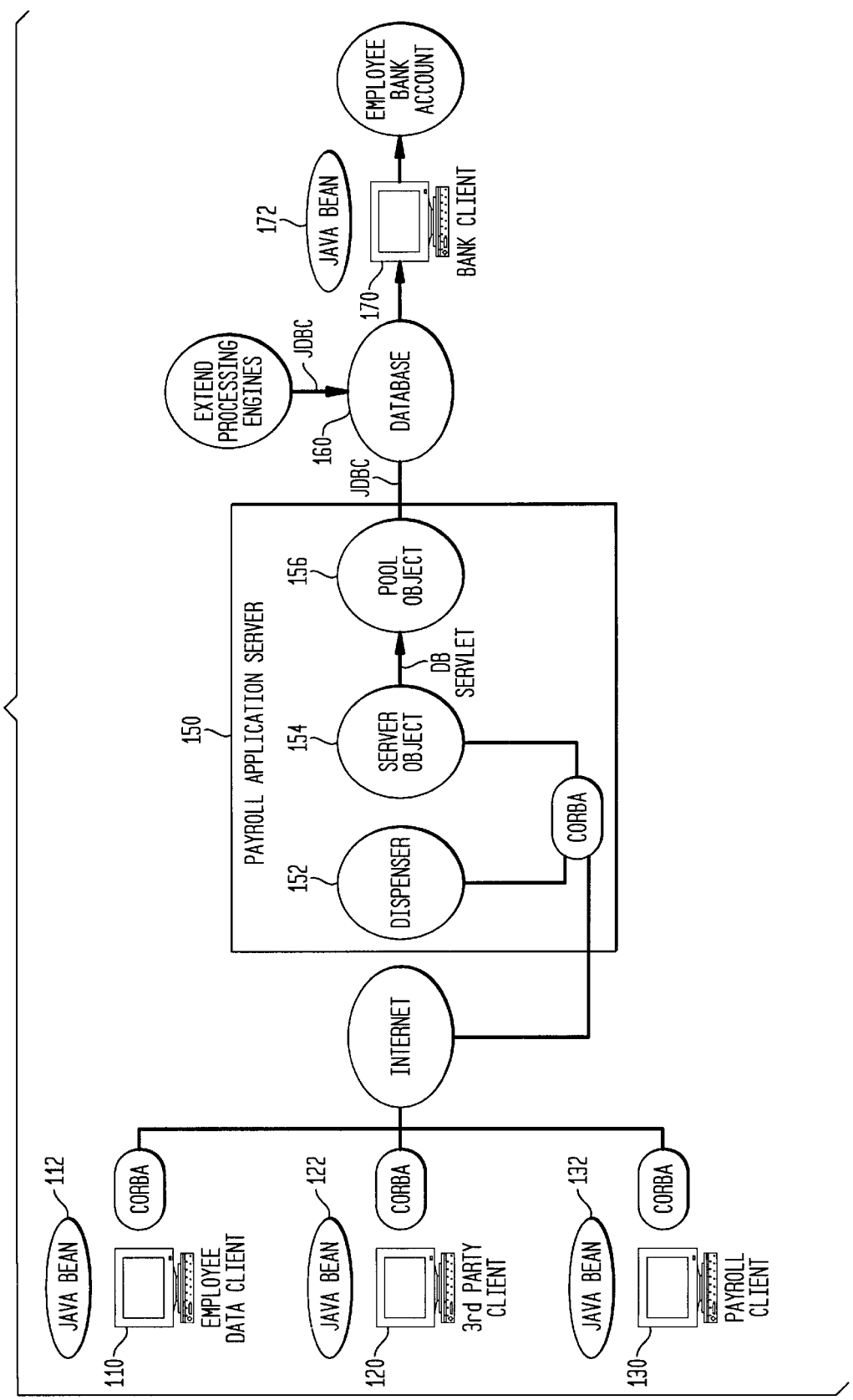
FIG. 3 is a block diagram of an automated direct payroll processing system in accordance with a preferred embodiment of the present invention.

FIG. 3 provides a system block diagram of a preferred embodiment of the instant invention using CORBA and Java technologies. CORBA (Common Object Request Broker Architecture) is well-recognized architecture that enables "objects," which are pieces of programs, to communicate with one without regard to the programming language in which the objects were written or what operating system they were designed for. Java, an object-oriented programming language similar to C++, was developed by Sun Microsystems to take advantage of the World Wide Web. Java source code files can be compiled into a format that can be executed by a Java interpreter. Compiled Java code runs on most computers because Java interpreters and runtime environments are available on most operating systems, using Java-compatible Web browsers, such as Netscape Navigator or Microsoft Internet Explorer.

The present invention preferably also uses the Java technology of "JavaBeans," which are reusable software objects that can be combined to create traditional or new applications. The advantage of using JavaBeans is that they provide a means to use other third party payroll applications and calculation logic. JavaBeans allows vendors to co-exist with architecture without redevelopment of the code. JavaBeans can be executed in a Java Virtual Machine. Since processing using JavaBeans can occur on the source computer, it allows you to have a thin client. By the same token, if processing speed is faster in the client computer, the JavaBean logic can be executed by the client computer. JavaBeans are similar to ActiveX controls and can be used by any application that understands the JavaBeans format. The principal difference between ActiveX controls and JavaBeans are that ActiveX controls can be developed in any programming language but executed only on a Windows platform, while JavaBeans can be developed only in Java, but can run on any platform. While the use of JavaBeans is a preferred embodiment, the system can also operate using ActiveX instead of JavaBeans.

JavaBeans are reusable and distributable components, and thus enable developers to write reusable components once they run them anywhere, therefore benefiting from the platform-neutral power of Java technology. JavaBeans bridge proprietary component models and provide a powerful means for developers to build components that run in ActiveX container applications. While individual JavaBeans perform in unique manners, JavaBeans have several common features. JavaBeans provide "introspection," which enables a builder tool to analyze how a JavaBean works. Developers can use an application builder to customize the appearance and function of JavaBeans. JavaBeans can communicate with each other and have properties that enable developers to customize and program with JavaBeans. JavaBeans also have "persistence" to allow developers to customize JavaBeans in an application builder. The JavaBeans can be retrieved with their customized features intact, for future use. Detailed information about JavaBeans and Java can be found at Sun Microsystem's website at the URL http://java.sun.com and in the book "Client/Server Programming with Java and CORBA, Second Edition," by Robert Orfali and Dan Harkey, February 1998, John Wiley & Sons, the disclosures of which are herein incorporated by reference.

The present invention preferably uses a three-tier client/server solution. In the three-tier solution used by the present invention, CORBA client JavaBeans "talk to" or communicate with CORBA server objects. The server objects in turn talk to one or more database management systems using JDBC (Java Database Connectivity), a Java-based programming interface that enables Java programs to execute SQL statements. This allows Java programs to interact with any SQL-compliant database. JDBC makes it possible to write a single database application that can run on different platforms and interact with different database management systems which enables one to store, modify, and extract information from a database using SQL. One advantage, therefore, of using the described three-tier client/server solution is that all of the T&A information, all of the HR information and all of the payroll information can be stored together on a single database, instead of three separate databases, as would be required if a centralized processor was used.

Referring to FIG. 3, the three-tier solution is comprised of direct pay clients, a direct pay application Server, and a database. The direct pay clients include employee data client 110, third-party client 120 and a payroll client 130. The employee data client is provided with an employee data client JavaBean 112. In the alternative, the employee data client 110 can consist of separate T&A and HR clients with T&A and HR JavaBeans. The third-party client 120 is provided with a third-party client JavaBean 122. The payroll client 130 is provided with a Payroll JavaBean 132. The employee data client JavaBean 112 provides access to the information from the time and attendance and the human resources computer systems. The third-party JavaBean 122 provides access to information from third parties, including, for example, tax deduction calculation logic operative to calculate tax deductions from gross work segment pay in amounts corresponding to the duration of the completed work segment. The payroll client JavaBean 132 includes calculation logic to process information from the three payroll operations. Calculations for net work segment pay can be performed solely by the payroll JavaBean 132 of the payroll client 130, or can be performed by both the payroll JavaBean 132 and the third party JavaBean 122 of the third party client 120 in a distributed computing architecture. The net pay calculations are based upon the information provided to the payroll JavaBean, and if desired the third party JavaBean, by the T&A and HR JavaBeans. One or more additional third party JavaBeans can be used to provide the external data to the payroll client for net pay calculation. The JavaBeans together provide shift completion information, pay amount information and pay deduction information to the payroll application server 150.

The middle-tier payroll application server 150 comprises a dispenser 152, server objects 154 and pool objects 156. The dispenser 152 determines whether to send business logic to JavaBeans. The dispenser 152 further contains logic of how data must look at database and how it will look at the client. The pool objects 156 are worker objects with persistent JDBC connections. The middle-tier server further uses a DB servlet. The DB servlet provides logic for connecting the middle tier payroll application server 150 to the JDBC database 160.

The third tier consists of the JDBC database 160. The JDBC database is where the persistent state is stored. The database 160 is connected to the bank client 170. The bank client is provided with a Bank JavaBean 172. Finally, the bank client is connected to the employee's bank account, so that when the bank client invokes the result of the processing, the bank can deposit the employee's pay. The Bank client 170 is provided with data indicative of the net work segment pay by the Bank JavaBean 172 once an employee's net work segment pay is calculated. Once net work segment pay is calculated, the employee is provided with immediate access to the calculated net work segment pay.

An example of how the JavaBeans are used with the system now follows. A T&A JavaBean can be used to modify, update or change an employee's time and attendance information when entered into the T&A computer system. For example, a company's policy may be that an employee can work overtime on his usual ten hour shift by only up to an additional two hours of overtime. Thus, if an employee works a thirteen hour shift instead of the ten hour shift, the T&A JavaBean can be programmed to automatically modify the employee's shift completion information such that the logging in of the thirteen hour shift is reduced to a twelve hour shift for purposes of the net pay calculation such that the employee is only paid for twelve hours of work. The results of the T&A JavaBean calculation/reduction is stored in the database 160. Although the additional one hour worked by the employee may not result in an increase in net pay, this information could be used, for example, in determining year end bonuses or in job performance reviews.

A human resources JavaBean can be used to automatically modify human resources information upon the occurrence of a predetermined event. For example, if an employee violates a company policy of only allowing three sick days per month, the company policy may be to dock that employee a given amount of pay. The human resources JavaBean can thus be used to provide the logic to calculate how much an employee's wages are to be garnished per work segment as tied into the number of days the employee calls in sick. The reduction in pay information calculated by the human resources JavaBean is also stored in the database 160.

The payroll JavaBean 132 calculates net work segment pay for each work segment completed the employee using said net pay calculation logic. The calculation is done in real-time and immediately upon entry of the employee's shift completion information. The data necessary for the net pay calculation is retrieved from the database 160 and the payroll JavaBean 132 determines gross work segment pay based on the shift completion information and pay amount information (as entered or as modified by the JavaBeans) and then determines net work segment pay by applying the pay deduction information to the gross work segment pay.

Preferably, third party JavaBean 122 associated with third party client 120 is also used in the calculation of the employee's net pay. For example, the third party JavaBean may be used to provide calculations using third party pro-rated tax tables to calculate pro-rated deductions to the net work segment pay.

The employee data computer, the payroll client computer, the third party deduction computer and the banking client computer are all linked to the payroll application server computer through the Internet using a programming language-neutral communications protocol, such as CORBA.

The advantage of using software components, such as JavaBeans, rather than an inflexible centralized processor is that it frees payroll departments from application development, and provides them with the opportunity to build up a reusable code base. This in turn provides a great deal more flexibility.

The present invention can also be implemented through other architectures besides the Java programming techniques described above. Namely, another preferred way of implementing the present invention is through the use of a multi-tiered network computing environment such as Oracle's NCA (Network Computing Architecture). Multi-tiered network computing environments, such as Oracle's NCA, provide multiple modules or tiers which accept discrete software programs known as "cartridges" (akin to JavaBeans) which are specifically written for each particular module. With NCA, three distinct tiers are provided, including a universal data server, an application server, and a universal client. The universal data server provides for file and data management. The application server provides an industry-standard application server, including "listener-independent" application development and deployment environment for the Web. The universal client comprises any client device used to access applications and/or information from within NCA, such as personal computers, Java and/or Web browser-based clients, mobile devices and network computers.

NCA pluggable cartridges are software programs or components that include applications or components of applications. NCA provides for the use of three distinct types of cartridges, including client cartridges, application server cartridges and data cartridges. These cartridges are pluggable into the respectively named tiers provided by NCA.

Client cartridges allow clients to access applications and information within NCA, and can include user-interface applets and audio/video plug-ins. Thus, client cartridge contains visualization programming to enhance user presentation services at the client tier level. Application server cartridges contain logic for running and managing one or more applications. Data cartridges contain the data manipulation logic, and can also enable users to create special extended data types such as image, text, or time series data types. The cartridges communicate with one another across distributed architectures through the use of a bus known as ICX (InterCartridge Exchange), a common communication layer, based on published protocols and standard interfaces.

Figure 1:
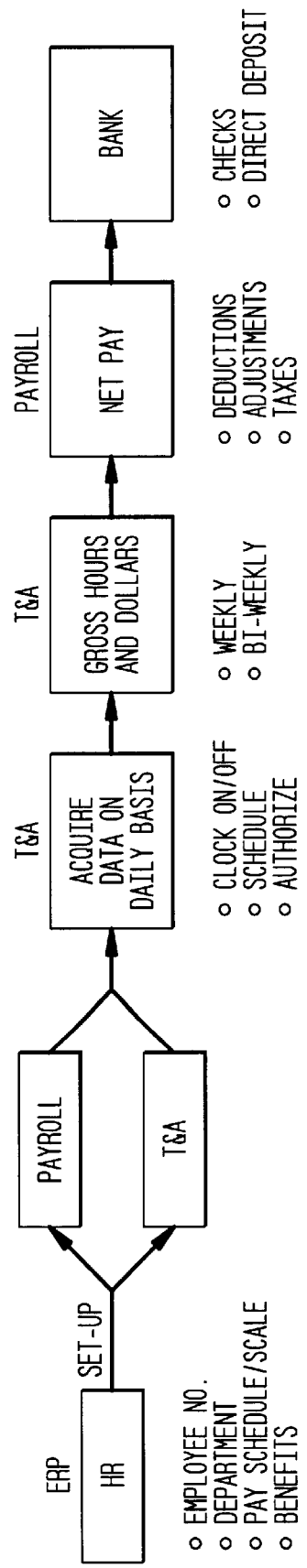
FIG. 1 is a flow diagram of the flow of prior art payroll processing systems
Figure 4:
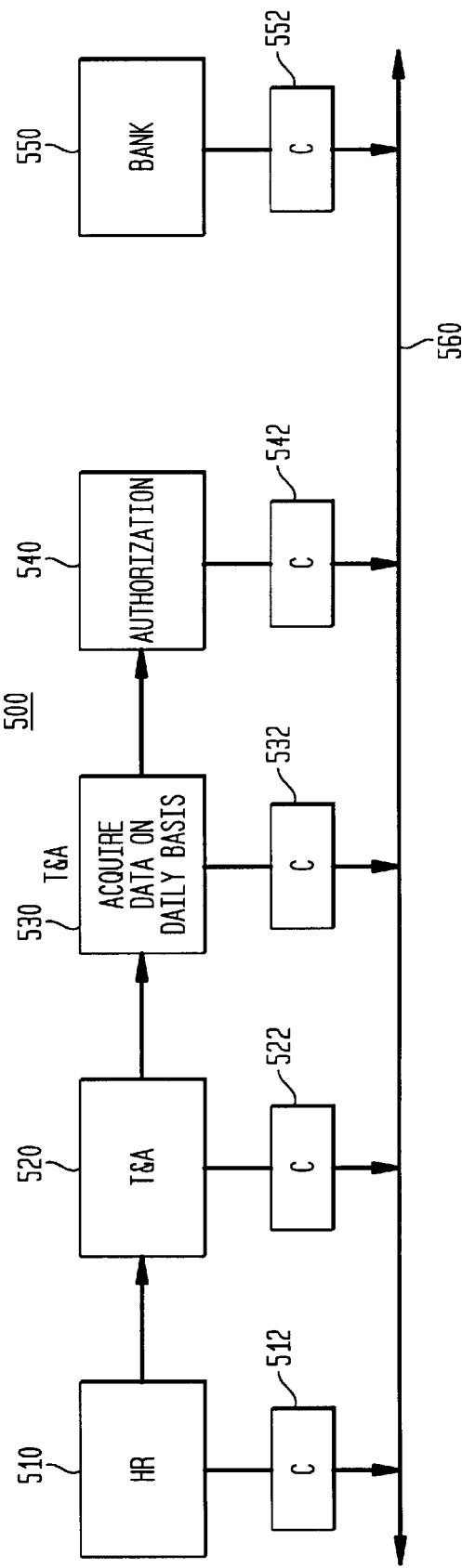
FIG. 4 is a block diagram of an automated direct payroll processing system in accordance with an alternate embodiment of the present invention.

Referring to FIG. 4, an alternate preferred embodiment of the present invention for direct payroll processing is shown using NCA architecture. The system 500 includes HR server computer 510, T&A server computer 520 and Bank server computer 550. T&A server computer 520 can include additional server computers including acquisition server 530 and authorization server 540. Alternatively, only a single server need be provided which performs these functions.

Each of the server computers is provided with an NCA pluggable cartridge including HR client cartridge 512, T&A client cartridges 522, 532 and 542 and Bank server client cartridge 552. As with JavaBeans, each of the pluggable cartridges comprises a software component and together form a comprehensive program for direct payroll processing in accordance with the present invention. The computers and cartridges are linked via the computer network 560, which preferably comprises the Internet and the use of an ICX bus as discussed above.

With this embodiment of the present invention, as shown in FIG. 4, the outside payroll service and software is eliminated and application cartridges are provided to each system, including HR system 510, T&A system 530 and Banking system 550. With this arrangement, the bank and the employer can communicate directly though the computer network 560 via pluggable cartridges with the appropriate servers and necessary hardware and software for running NCA. The T&A computer system can also be provided with one or more cartridges for providing the necessary calculations to determine gross hours and dollars, authorization and other functionality needed by the bank cartridge.

With such a cartridge, the bank, and not the outside payroll service, now has the application to automatically calculate the paycheck amounts based on the gross hour and dollars information and the deduction information provided by the T&A and human resource systems via their application cartridges.

The present invention provides numerous advantages over existing payroll systems. For instance, the bank will now have access to much more information about the individual employee's payment-related information than it currently receives from the outside payroll service. Such information would include, for example, daily or per shift payment information, how each payment was computed based on shift worked, which deductions are applied from the company, how much overtime was worked, etc. This type of information is currently only available to the employer through the employer's T&A system. Thus, certain T&A data could be provided to the bank and, in turn, the bank's customers (i.e., employees of the employer) allowing customers to obtain on-line information about their accounts (via the Web or the like) to obtain current account and payment information.

Using the present invention, employees can see, preferably on a daily basis or at the completion of a work segment less than daily shift, what they were paid, why they were paid a certain amount (e.g., yesterday I worked overtime for 2 hours at level 4 pay scale), what deductions were made, etc.

Because the present invention eliminates the red tape associated with a middleman payroll service, payroll calculations can be made immediately on a per work segment basis, instead of in a weekly or bi-weekly basis. With direct deposit on a per work segment basis, the employee now has instant access to the pay that he or she has earned each day or shift and need not wait for two weeks until the next paycheck is cut or deposited. Of course, with employees now having their earned pay immediately upon completion of the shift or on a daily basis, retailers and all businesses will benefit with consumers having ready access to disposable income.

The system of the present invention is highly advantageous to the banks as well. The system would create more interest by the employees in their accounts and account activity since employees will be accessing their account information on-line on a much more frequent basis since the bank can now provide more detailed information than currently available. Banks could then use this increased traffic by its customers for marketing opportunities to advertise new services and products to its customers. This present invention will also provide companies with a new means of attracting employees, since most workers will prefer to be paid daily, or sooner, instead of every two weeks. The present invention thus helps employees who struggle from paycheck to paycheck who formerly could not gain to their pay for weeks.

As these and other variations and combinations of the features discussed above can be utilized without departing from the present invention as defined by the claims, the foregoing description of the preferred embodiments should be taken by way of illustration rather than by way of limitation of the present invention.

What is claimed is:

1. A computer-implemented method for automatically paying employees net pay immediately upon a triggering event indicative of completion of a work segment, comprising:

(a) providing an employee data computer system, a banking computer system and a payroll processing computer system, each of said computer systems being interconnected via a computer network;

(b) acquiring in real-time time and attendance information by said employee data computer system from each employee including shift completion triggering information indicative of the completion of at least one work segment;

(c) inputting human resource information about each employee into said employee data computer system including pay amount information and pay deduction information for each employee;

(d) providing said shift completion triggering information, pay amount information and pay deduction information to said payroll processing computer system via said computer network;

(e) calculating, by said payroll processing computer system, net work segment pay for each work segment completed by the employee, in real-time and immediately upon entry of said shift completion triggering information, by determining (i) gross work segment pay based on said shift completion information and said pay amount information and (ii) said net work segment pay by applying said pay deduction information to said gross work segment pay; and (f) providing data indicative of said net work segment pay to said banking computer system via said computer network upon the completion of step (e) to provide the employee with immediate access to said calculated net work segment pay.

2. The method of claim 1, further comprising directly depositing said net work segment pay to the employee's bank account.

3. The method of claim 1, wherein said shift completion triggering information comprises a completion of shift event entered by the employee.

4. The method of claim 1, wherein said shift completion triggering information comprises a supervisor approval event of the completed work segment.

5. A computer-implemented system for automatically paying employees net pay immediately upon a triggering event indicative of completion of a work segment, comprising:

(a) an employee data client computer system including at least one time and attendance software object and at least one human resource software object;

(b) at least one input terminal connected to said employee data client computer system for acquiring in real-time time and attendance information from each employee including shift completion triggering information indicative of the completion of at least one work segment;

(c) at least one input terminal connected to said employee data client computer system for inputting human resource information about each employee including pay amount information and pay deduction information for each employee;

(d) said at least one time and attendance software object comprising time and attendance logic operative to automatically modify said shift completion triggering information under predetermined conditions, and said at least one human resource software object comprising human resource logic operative to automatically modify said pay amount information under predetermined conditions;

(e) a payroll client computer with at least one payroll software object comprising net pay calculation logic for computing net work segment pay;

(f) a payroll application server computer connected to said employee data client computer system and said payroll client computer via the Internet using a programming language-neutral communications protocol;

(g) a computer storage device in communication with said payroll application server computer for storing said shift completion information, pay amount information, pay deduction information and net work segment pay;

(h) a banking client computer in communication with said computer storage device;

(i) said payroll software object being operative to calculate, using said net pay calculation logic, net work segment pay for each work segment completed by the employee, in real-time and immediately upon entry of said shift completion triggering information, by determining (i) gross work segment pay based on said shift completion information and said pay amount information and (ii) said net work segment pay by applying said pay deduction information to said gross work segment pay, and wherein said banking client computer is operative to automatically receive data indicative of said net work segment pay upon completion of the net work segment pay calculation to provide the employee with immediate access to said calculated net work segment pay.

6. The computer-implemented system of claim 5, further comprising a third party client computer connected to said payroll application server via the Internet using a programming language-neutral communications protocol and including a third party deduction calculation software object comprising deduction logic operative to calculate additional deductions, to be included with said pay deduction information, in proportion to said gross work segment pay.

7. The computer-implemented system of claim 6, wherein said deduction logic is operative to calculate tax deductions from said gross work segment pay in amounts corresponding to the duration of the completed work segment.

8. The computer-implemented system of claim 5, wherein said software objects comprise JavaBeans.

9. The computer-implemented system of claim 5, wherein said programming language-neutral communications protocol comprises CORBA.

10. The computer-implemented system of claim 5, further comprising directly depositing said net work segment pay to the employee's bank account.

11. The computer-implemented system of claim 5, wherein each employee is provided with on-line access to securely log onto a website associated with said banking computer system to check on and verify the provision of said net work segment pay to the employee's bank account.

12. The computer implemented system of claim 5, wherein said shift completion triggering information comprises a completion of shift event entered by the employee.

13. The computer implemented system of claim 5, wherein said shift completion triggering information comprises a supervisor approval event of the completed work segment.

14. A computer-implemented system for automatically paying employees net pay immediately upon a triggering event indicative of completion of a work segment, comprising:

(a) an employee data computer system, a banking computer system and a payroll processing computer system, each of said computer systems being interconnected via a computer network;

(b) at least one input terminal connected to said employee data computer system for acquiring in real-time time and attendance information from each employee including shift completion triggering information indicative of the completion of at least one work segment;

(c) at least one data terminal connected to said employee data computer system for inputting human resource information about each employee including pay amount information and pay deduction information for each employee;

(d) said payroll processing computer system including calculation logic for calculating net work segment pay for each work segment completed the employee, in real-time and immediately upon entry of said shift completion triggering information, by determining (i) gross work segment pay based on said shift completion information and said pay amount information and (ii) said net work segment pay by applying said pay deduction information to said gross work segment pay; and (e) said banking computer system being operative to receive data indicative of said net work segment pay upon the net work segment pay calculation to provide the employee with immediate access to said calculated net work segment pay.

15. The system of claim 14, wherein said banking computer system is operative to directly deposit said net work segment pay to the employee's bank account.

16. The system of claim 14, wherein said shift completion information provided by at least one input terminal includes information approving the completion of the work segment.

17. The system of claim 14, wherein said employee data computer system comprises a time and attendance computer system and a human resources computer system.

18. The system of claim 14, wherein said payroll processing computer system comprises two or more payroll computers and said net work segment pay calculation is performed in part on each of said payroll computers.

19. The computer implemented system of claim 14, wherein said shift completion triggering information comprises a completion of shift event entered by the employee.

20. The computer implemented system of claim 14, wherein said shift completion triggering information comprises a supervisor approval event of the completed work segment.

21. A computer-implemented system for automatically paying employees net pay upon a triggering event indicative completion of a work segment, comprising:

(a) a multi-tiered computer network comprising at least a client and application tier interfacing with one or more client and application cartridges to permit communications among said cartridges over a common communications bus;

(b) a human resource computer system including an ERP program operative to store and manage employee payroll characteristics including pay amount information and pay deduction information, said ERP program including at least one ERP application cartridge interfacing with said application tier;

(c) a time and attendance computer system connected to said computer network for acquiring in real-time time and attendance information from each employee, including shift completion triggering information indicative of the completion of at least one work segment, said T&A computer system including at least one time and attendance application cartridge interfacing with said application tier; and (d) a banking computer system connected to said computer network including at least one payment application cartridge operative to calculate network segment pay for each work segment completed by the employee, in real-time and immediately upon entry of said shift completion triggering information by the employee, by determining (i) gross work segment pay based on said shift completion information and (ii) said network segment pay by applying said pay deduction information to said gross work segment pay.

* * * * *

UNITED STATES PATENT AND TRADEMARK OFFICE
CERTIFICATE OF CORRECTION

PATENT NO.      : 6,347,306 B1
DATED           : February 12, 2002
INVENTOR(S)     : Marius Swart It is certified that error appears in the above-identified patent and that said Letters Patent is hereby corrected as shown below:

<u>Title page,</u>
Item [73], Assignee, "CyberShift.com, Inc." should read -- CyberShift Holdings, Inc. --
Item [57], ABSTRACT,
Line 6, after "completed" insert the -- by --.

<u>Column 1,</u>
Line 35, after "rates" insert -- , --.

<u>Column 2,</u>
Line 67, after "completion" insert -- of the --.

<u>Column 5,</u>
Line 13, after "systems" insert -- . --.

<u>Column 7,</u>
Line 39, "deposits" should read -- deposit --.

<u>Column 8,</u>
Line 2, "allows" should read -- allow --.
Line 11, "are" should read -- is --.

<u>Column 10,</u>
Line 11, after "completed" insert -- by --.

<u>Column 14,</u>
Line 55, after "completed" insert -- by --.

UNITED STATES PATENT AND TRADEMARK OFFICE
CERTIFICATE OF CORRECTION

PATENT NO. : 6,347,306 B1
DATED : February 12, 2002
INVENTOR(S) : Marius Swart

It is certified that error appears in the above-identified patent and that said Letters Patent is hereby corrected as shown below:

Column 15,
Line 22, after "indicative" insert -- of --.

Signed and Sealed this

Twenty-fourth Day of September, 2002

Attest:

Attesting Officer

JAMES E. ROGAN
Director of the United States Patent and Trademark Office